(12) United States Patent
Hossain et al.

(10) Patent No.: US 7,756,075 B2
(45) Date of Patent: Jul. 13, 2010

(54) SYSTEM AND METHOD OF DATA ACCESS FOR MOBILE STATIONS

(75) Inventors: Asif Hossain, Kanata (CA); David Ma, Ottawa (CA)

(73) Assignee: Research In Motion Limited, Waterloo, ON (CA)

( * ) Notice: Subject to any disclaimer, the term of this patent is extended or adjusted under 35 U.S.C. 154(b) by 405 days.

(21) Appl. No.: 11/226,270

(22) Filed: Sep. 15, 2005

(65) Prior Publication Data

US 2007/0058578 A1    Mar. 15, 2007

(51) Int. Cl.
   *H04Q 7/00*    (2006.01)
(52) U.S. Cl. ...................... 370/328; 370/338
(58) Field of Classification Search .......... 370/328, 370/331, 338, 437, 465; 455/127.4, 417, 455/426.1, 436, 448, 550.1, 552.1, 553.1
   See application file for complete search history.

(56) References Cited

U.S. PATENT DOCUMENTS

| | | | |
|---|---|---|---|
| 6,009,325 A * | 12/1999 | Retzer et al. ................ 455/434 |
| 6,058,316 A * | 5/2000 | Takahashi ................ 455/552.1 |
| 6,119,003 A | 9/2000 | Kukkohovi et al. |
| 6,321,097 B1 * | 11/2001 | Kim ........................ 455/553.1 |
| 6,408,020 B1 * | 6/2002 | Kaji et al. .................... 375/216 |
| 2002/0176382 A1 * | 11/2002 | Madour et al. .............. 370/331 |
| 2002/0191562 A1 * | 12/2002 | Kumaki et al. .............. 370/331 |
| 2003/0065067 A1 * | 4/2003 | Miwa et al. .................. 524/100 |
| 2004/0087305 A1 | 5/2004 | Jiang et al. |
| 2004/0106401 A1 * | 6/2004 | Ormson ...................... 455/423 |
| 2005/0037755 A1 | 2/2005 | Hind et al. |
| 2005/0043026 A1 * | 2/2005 | Brok et al. .................. 455/434 |
| 2006/0040665 A1 * | 2/2006 | Lai et al. .................. 455/435.2 |
| 2006/0172737 A1 * | 8/2006 | Hind et al. ............... 455/435.2 |

* cited by examiner

*Primary Examiner*—Lester Kincaid
*Assistant Examiner*—Phuoc Doan

(57) ABSTRACT

Method and apparatus for data access for a mobile terminal comprising a module for determining whether first and second modes of wireless network coverage is available, a module for selecting the first mode if available, a module for attempting access via the second mode on failure to establish access via the first mode and a module for monitoring availability of the first mode. Even when a connection is established via the second mode, availability of the first mode is monitored and access attempted, when second mode connection is idle.

14 Claims, 3 Drawing Sheets

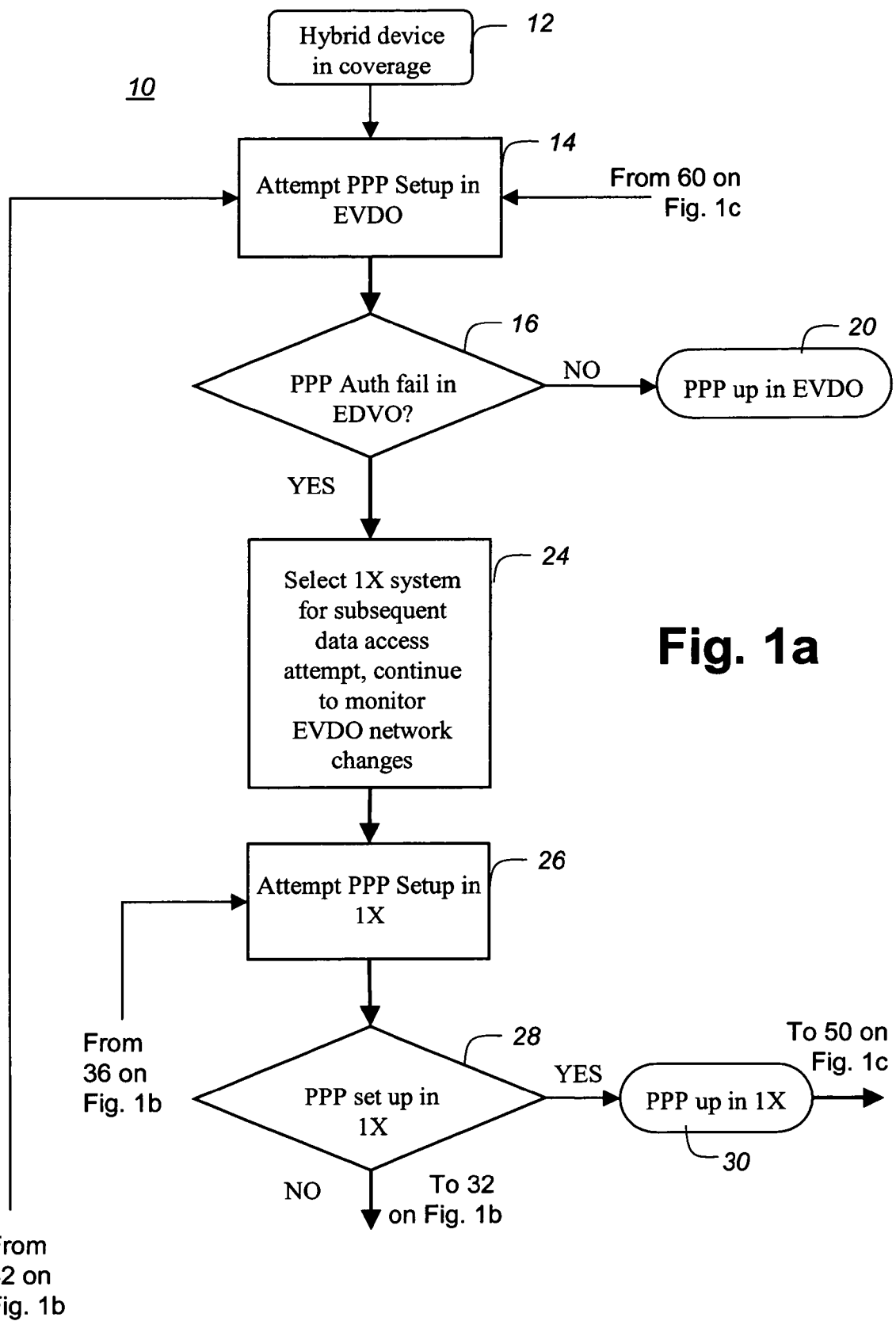

SYSTEM AND METHOD OF DATA ACCESS FOR MOBILE STATIONS

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

This patent document relates generally to mobile stations, and in particular to a system and method of data access for mobile stations.

BACKGROUND

In a mixed coverage area of 1XRTT and 1XEV-DO, it is very possible for carriers to deploy separate PDSN/AAA to manage each wireless network separately. Because of the separate management, it is possible for carriers to control data access (i.e. establish a PPP session) to each network with separate mobile authentication rules.

An EVDO capable device, when queried about Protocol Capability for Over The Air Provisioning, it will inform the network that it is capable of IS-683C version of PRL. Network therefore can download an IS-683C version of PRL but it is possible that user may not purchase EVDO service. Under such circumstances, device SW is unaware of such service unavailability and therefore will always try to perform any data access through the EVDO network. The EVDO standard already has the provision for AN level authentication, which is an optional feature that a carrier may or may not be implemented.

For scenarios where AN Authentication is disabled but PDSN/AAA authentication is separate between EVDO & 1X network, there needs to be a mechanism for a device with EVDO PRL but not configured by network for EVDO service to fall back to 1X system for data service; this behaviour is currently undefined.

Also, if the user later on purchases EVDO service, there needs to be a seamless mechanism for the device to resume from 1X fall back condition to start using the EVDO service without the need to reconfigure anything on the device—this behaviour is also not defined any where.

Hence there is a need for an improved data access method and apparatus for mobile terminal.

BRIEF DESCRIPTION OF THE DRAWINGS

An embodiment of the patent disclosure will now be described by way of example only with reference to the following drawings in which:

FIGS. 1a, 1b and 1c there is illustrated in a flow chart a method of data access for a mobile terminal, in accordance with an embodiment of the patent disclosure.

DETAILED DESCRIPTION

Figure 1B:
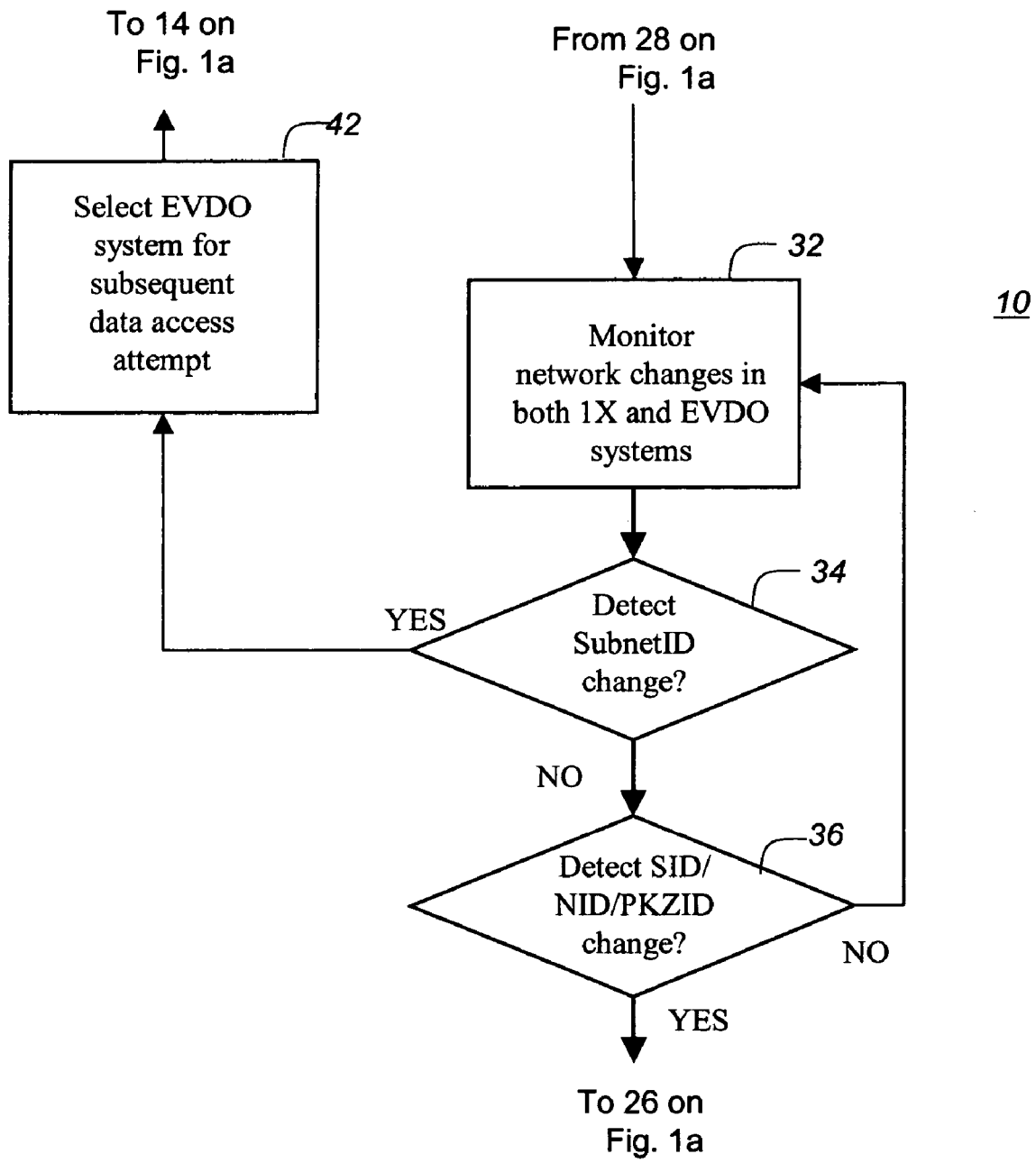

The patent disclosure describes a solution to one or more of the problems described above.

In accordance with an embodiment of the patent disclosure, there is provided a method of data access for a mobile terminal comprising the steps of determining whether first and second modes of wireless network coverage is available, selecting the first mode if available, on failure to establish access via the first mode, attempting access via the second mode and monitoring availability of the first mode.

In accordance with an embodiment of the patent disclosure, there is provided an apparatus for data access for a mobile terminal comprising a module for determining whether first and second modes of wireless network coverage is available, a module for selecting the first mode if available, a module for attempting access via the second mode on failure to establish access via the first mode and a module for monitoring availability of the first mode.

A system and method of the patent disclosure will now be described with reference to various examples of how the embodiments can best be made and used. For convenience, like reference numerals are used throughout the description and several views of the drawings to indicate like or corresponding parts, wherein the various elements are not necessarily drawn to scale.

The present patent disclosure describes various use cases related to PPP authentication retry procedures for 1X/1XEV-DO hybrid mobiles.

The present patent disclosure uses the following acronyms:

| | |
|---|---|
| 1XEV-DO | 1X Evolution, Data-Only |
| PPP | Point-to-Point Protocol |
| CHAP | Challenge-Handshake Authentication Protocol |
| SID | System ID |
| NID | Network ID |
| PKZID | Packet Zone ID |

Figure 1C:
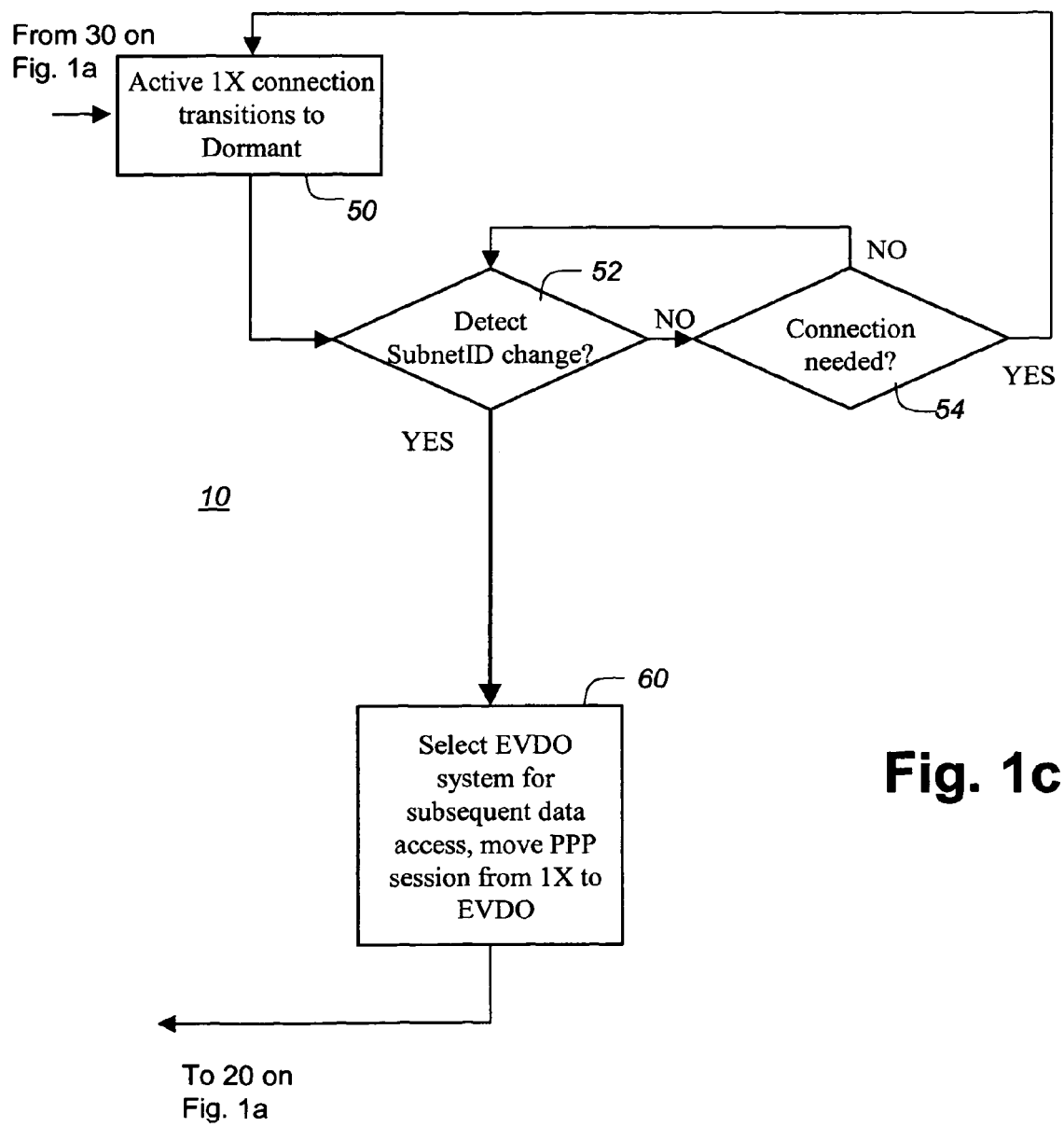

Referring to FIGS. 1a, 1b and 1c there is in a flow chart a method of data access for a mobile terminal, in accordance with an embodiment of the patent disclosure. The present method of data access 10 is illustrated in FIG. 1a. A hybrid device is in coverage for both 1X and 1XEV-DO systems as represented by state block 12. The hybrid device attempts a PPP session setup in EVDO as represented by process block 14. A decision block 16 determines if PPP authentication failed in EVDO. If NO as state "PPP up in EVDO" is entered at 20.

A YES to decision block 16 leads to a process block 24, which selects 1X system for subsequent data access attempts. Device will continue to monitor network changes in EVDO system.

Process block 24 leads to process block 26, which attempts to set up PPP session in 1X. A decision block 28 determines whether PPP set up in 1X occurred, if YES the hybrid device enters a "PPP up in 1X" state 30. If NO, the process passes on to block 32 of FIG. 1b.

Referring to FIG. 1b a process block 32 monitors network changes in both 1X and EVDO systems. Following step 32, a decision block 34 detects whether a SubnetID change has occurred. If NO, a decision block 36 detects whether a SID/NID/PKZID change has occurred. If YES, the process returns to the process block 26 of FIG. 1a.

A YES to decision block 34 leads to a process block 42 which selects EVDO system for subsequent data access attempts and passes the process back to the process block 14 of FIG. 1a. A NO to the decision block 36 returns to monitoring network changes at process block 32.

Referring to FIG. 1c a process block 50, coupled to the state block 30 of FIG. 1a, monitors when an active 1X connection transitions to a dormant state. Following step 50, a decision block 52 detects whether a SubnetID change has occurred. If NO, a decision block 54 determines if a connection is needed. If YES, the path returns to process block 50. If NO, the path returns to the decision block 52.

A YES to the decision block 52 leads to a process block 60, which selects EVDO system for subsequent data access, and moves the PPP session from 1X to EVDO. Process block 60 leads to a state block 20, which represents the device as having an active PPP session in EVDO.

The generalized method of FIGS. 1a, 1b, and 1c can be used for a number of situations. By way of example several use cases are presented. For each case preconditions and post conditions are given as well as the steps taken by the process of FIGS. 1a, 1b and 1c to transition the hybrid device.

Use Case 1: EVDO Auth Failure, Successful PPP Setup in 1X

Preconditions:
Hybrid device in 1XRTT/1XEV-DO coverage
Session, connection established in EVDO
LCP negotiation successful
Attempt data access authentication using negotiated protocol (e.g. CHAP)

Postconditions:
PPP established in 1X

Exposition:

1. Data access authentication fails in EVDO coverage, block 16.

2. Select 1X system for subsequent data access attempts, block 24.

3. Retry PPP setup in 1X, block 26.
Use Case 2: EVDO Auth Failure, 1X Auth Failure Preconditions:
Hybrid device in 1XRTT/1XEV-DO coverage
Session, connection established in EVDO
LCP negotiation successful
Attempt data access authentication using negotiated protocol (e.g. CHAP)

Postconditions:
No PPP session active

Exposition:

1. Data access authentication fails in EVDO coverage, block 16.

2. Select 1X system for subsequent data access attempts, block 24.

3. Retry PPP setup in 1X, block 26.

4. Data access set up in 1X coverage, block 28 and up in block 30.
Use Case 3: Data Auth Failure, PPP Retry on SubnetID Change Preconditions:
Hybrid device fails EVDO and 1X data authentication Postconditions:
Attempt PPP retry in 1X Exposition:

1. Hybrid device detects change in SubnetID from received overhead messages, block 34.

2. Select EVDO system for subsequent data access attempts, block 42.

3. Retry PPP setup in EVDO, block 14.
Use Case 5: Data Auth Failure, PPP Retry on SID/NID/PKZID Change Preconditions:
Hybrid device fails EVDO and 1X data authentication
No change in SubnetID detected Postconditions:
Attempt PPP retry in 1X Exposition:

1. Hybrid device detects change in SID/NID/PKZID from received overhead messages, block 36.

2. Retry PPP setup in 1X, block 26.
Use Case 6: 1X PPP Established, Idle 1X Connection, No Pending Data, Detect New SubnetID Preconditions:
PPP session active in 1X
1X connection is dormant Postconditions:
PPP established in EVDO Exposition:

1. Hybrid device detects change in SubnetID from received overhead messages, block 52.

2. Select EVDO system for subsequent data access, block 60. Move the active PPP session from 1X to EVDO.

3. PPP active in EVDO, block 20.
Use Case 7: 1X PPP Established, Idle 1X Connection, Pending Data, Detect New SubnetID Preconditions:
PPP session active in 1X
1X connection is dormant Postconditions:
Attempt PPP retry in EVDO Exposition:

1. Hybrid device detects change in SubnetID from received overhead messages, block 52.

2. Establish 1X connection to service pending data, block 54.

3. When connection transitions back to dormant, block 50, check if hybrid device is still in new subnet, block 52.

4. Select EVDO system for subsequent data access, block 60. Move the active PPP session from 1X to EVDO.

5. PPP active in EVDO, block 20.

While particular embodiments of the patent disclosure have been shown and described, changes and modifications may be made to such embodiments without departing from the true scope of the patent disclosure.

What is claimed is:

1. A method of data access for a mobile terminal capable of establishing data access to an EVDO network and a 1XRTT network within a coverage area, the method comprising:
authenticating, in the mobile terminal, an access to the 1XRTT network within the coverage area;
monitoring for a change of a subnet identifier and a packet zone identification in the coverage area;
determining an availability of the EVDO network in response to determining that the change of the subnet identifier and a packet zone identification has occurred;
authenticating access to the EVDO network in response to determining that the EVDO network is available; and
preparing the mobile device to communicate with a new subnet.

2. The method as claimed in claim 1, further comprising detecting at least one of a system identification change, and a network identification change.

3. The method as claimed in claim 1, wherein the monitoring the change of the subnet identifier includes on failure of authenticating access to the EVDO network, reverting to the 1XRTT network.

4. The method as claimed in claim 1, wherein the authenticating access to the EVDO network in response to determining that the EVDO is available comprises preparing the mobile device to communicate with a new subnet.

5. The method as claimed in claim 1, further comprising monitoring the EVDO network and the 1XRTT network before, during and after authenticating access to the EVDO network.

6. An apparatus providing data access for a mobile terminal capable of establishing data access to an EVDO network and a 1XRTT network within a coverage area, the apparatus comprising:
   a processor;
   means for authenticating an access to the 1XRTT network within the coverage area;
   means for monitoring for a change of a subnet identifier and a packet zone identification in the coverage area;
   means for determining an availability of the EVDO network in response to determining that the change of the subnet identifier and a packet zone identification has occurred; and
   means for authenticating access to the EVDO network in response to determining that the EVDO network is available; and
   means for preparing the mobile device to communicate with a new subnet.

7. The apparatus as claimed in claim 6, further comprising at least one of means for detecting a system identification change; and means for detecting a network identification change.

8. The apparatus as claimed in claim 6, wherein the means for authenticating access to the EVDO network monitoring network changes includes means for reverting to the first mode on failure of authenticating access to the second EVDO network.

9. The apparatus as claimed in claim 6, wherein the means for authenticating access to the EVDO network comprises means for preparing the mobile device to communicate with a new subnet.

10. The apparatus as claimed in claim 6, further comprising means for the EVDO network and the 1XRTT network before, during and after authenticating access to the EVDO network.

11. The apparatus as claimed in claim 6, further comprising:
   means for selecting the EVDO network if available in the coverage area; and
   means for authenticating access to the 1XRTT network on failure to establish access via the EVDO network within the coverage area.

12. The apparatus as claimed in claim 11, further comprising means for determining whether the EVDO network and the 1XRTT network are available within the coverage area.

13. The method as claimed in claim 1, further comprising:
   selecting the EVDO network if available in the coverage area; and
   on failure to establish access via the first wireless network, authenticating access to the 1XRTT network within the coverage area.

14. The method as claimed in claim 1, further comprising determining whether the EVDO network and 1XRTT network are available within the coverage area.

* * * * *